US010803266B2

(12) United States Patent
Wolf et al.

(10) Patent No.: US 10,803,266 B2
(45) Date of Patent: Oct. 13, 2020

(54) IDENTIFICATION DEVICE AND METHOD FOR IDENTIFYING IDENTIFIERS ON AND/OR FEATURES OF LABORATORY OBJECTS AND/OR OF SAMPLES LOCATED THEREIN, AND LABORATORY DEVICE HAVING SUCH AN IDENTIFICATION DEVICE

(71) Applicant: TECAN TRADING AG, Mannedorf (CH)

(72) Inventors: Markus Wolf, Mannedorf (CH); Fred Schinzel, Mannedorf (CH); Jurg Schneider, Hombrechtikon (CH)

(73) Assignee: TECAN TRADING AG, Mannedorf (CH)

( * ) Notice: Subject to any disclaimer, the term of this patent is extended or adjusted under 35 U.S.C. 154(b) by 0 days.

(21) Appl. No.: 16/318,076

(22) PCT Filed: Jul. 20, 2017

(86) PCT No.: PCT/EP2017/068333
§ 371 (c)(1),
(2) Date: Jan. 15, 2019

(87) PCT Pub. No.: WO2018/015483
PCT Pub. Date: Jan. 25, 2018

(65) Prior Publication Data
US 2020/0143128 A1 May 7, 2020

(30) Foreign Application Priority Data

Jul. 22, 2016 (CH) .......................... 949/16

(51) Int. Cl.
*G06F 17/00* (2019.01)
*G06K 7/10* (2006.01)
(Continued)

(52) U.S. Cl.
CPC ... *G06K 7/10722* (2013.01); *G01N 35/00732* (2013.01); *G06K 7/1413* (2013.01);
(Continued)

(58) Field of Classification Search
USPC ................ 235/375, 462.11, 462.32; 705/2, 3
See application file for complete search history.

(56) References Cited

U.S. PATENT DOCUMENTS 5,245,172 A 9/1993 Esslinger et al.
6,331,437 B1 * 12/2001 Cohen .................... G01N 35/04
436/43

(Continued)

FOREIGN PATENT DOCUMENTS

DE 19924259 A1 12/2000
EP 0738986 A1 10/1996
(Continued)

OTHER PUBLICATIONS

International Preliminary Report on Patentability and Written Opinion for corresponding PCT application No. PCT/EP2017/068333, dated Jan. 31, 2019.

(Continued)

*Primary Examiner* — Tuyen K Vo
(74) *Attorney, Agent, or Firm* — Notaro, Michalos & Zaccaria P.C.

(57) ABSTRACT

An identification device for identifying identifiers on and/or features of laboratory objects and/or of samples located therein in conjunction with automated laboratory systems or facilities, for example, medical, chemical, or pharmaceutical analysis devices. Barcodes on sample containers, for example, sample tubes, reagent tubs, or microplates are used, for example, as identifiers. An optical recording unit and a mirror are used, the spacing is variable for the detection of laboratory objects, each at different distances, (Continued)

from a recording distance by the optical recording unit is within a depth of field of the optical recording unit. The mirror is used for imaging the laboratory object to be detected on the optical axis. The identification device is substantially simplified, more reliable, and more cost-effective in comparison to known devices that use a zoom lens together with an autofocus unit.

40 Claims, 3 Drawing Sheets

(51) Int. Cl.
    *G01N 35/00*      (2006.01)
    *G06K 7/14*      (2006.01)

(52) U.S. Cl.
    CPC . *G06K 7/1417* (2013.01); *G01N 2035/00752* (2013.01); *G01N 2035/00772* (2013.01)

(56) References Cited

U.S. PATENT DOCUMENTS

| | | | |
|---|---|---|---|
| 6,801,260 B1 | 10/2004 | Veksland et al. | |
| 2001/0048029 A1 | 12/2001 | Kitagawa | |
| 2005/0226779 A1* | 10/2005 | Oldham | B01L 3/5027 422/400 |
| 2008/0018888 A1 | 1/2008 | Emilsson | |
| 2008/0056958 A1* | 3/2008 | Vijay | B01L 9/06 422/400 |
| 2008/0181473 A1* | 7/2008 | Garty | C40B 30/10 382/128 |
| 2008/0290169 A1 | 11/2008 | Gurevich et al. | |
| 2009/0028754 A1* | 1/2009 | Robb | B01L 9/06 422/65 |
| 2010/0104478 A1* | 4/2010 | Kondou | B01L 3/527 422/400 |
| 2013/0123089 A1 | 5/2013 | Johns et al. | |
| 2016/0025756 A1* | 1/2016 | Pollack | G01N 35/04 436/47 |

FOREIGN PATENT DOCUMENTS

| | | |
|---|---|---|
| EP | 1698995 A1 | 9/2006 |
| EP | 2148205 A1 | 1/2010 |
| WO | 2005/073895 A1 | 8/2005 |

OTHER PUBLICATIONS

European Search Report for corresponding Swiss application No. CH 9492016, dated Jan. 2, 2017.

International search report for corresponding PCT application No. PCT/EP2017/068333, dated Nov. 2, 2017.

* cited by examiner

IDENTIFICATION DEVICE AND METHOD FOR IDENTIFYING IDENTIFIERS ON AND/OR FEATURES OF LABORATORY OBJECTS AND/OR OF SAMPLES LOCATED THEREIN, AND LABORATORY DEVICE HAVING SUCH AN IDENTIFICATION DEVICE

TECHNICAL AREA OF THE INVENTION

The present invention relates to an identification device for identifying identifiers on and/or features of laboratory objects and/or of samples located therein, in particular in conjunction with automated laboratory systems or facilities, such as medical, chemical, or pharmaceutical analysis devices. These can be, for example, barcodes on sample containers, for example, sample tubes, reagent tubs, or microplates. Furthermore, a laboratory device, for example, a working area of an automated laboratory system, having an identification device according to the invention, and a corresponding identification method are proposed.

BACKGROUND OF THE INVENTION

When large quantities of samples are to be examined in medical, chemical, analytical, or pharmaceutical laboratories, presently automated laboratory systems or facilities are usually used, which enable rapid and reliable processing of each individual sample. The samples are usually supplied in sample containers, for example, sample tubes, reagent tubs, or microplates, which have an identifier, for example, a one-dimensional (1D) or two-dimensional (2D) barcode, which is printed on a label applied to the sample tube, so that, for example, items of information relating to the origin of the sample can be uniquely associated therewith. Before the processing of the samples, the identifier has to be read on each sample container or sample tube. Reagent vessels are also often provided with identifiers such as one-dimensional or two-dimensional barcodes, which contain items of information about the type of reagent, batch number, and expiration date. The reagent vessels can be vials or tubs. In automated analysis processes, standardized microplates are often used as reaction vessels. Such microplates have been specified and standardized by the American National Standards Institute (ANSI). To enable traceability of the samples, the microplates are also frequently provided with identifiers such as one-dimensional or two-dimensional barcodes. Accordingly, sample containers, sample tubes, reagent vials, microplates, tubs, and the like can be summarized under the term laboratory objects.

CCD ("charge-coupled device") scanners or laser scanners are typically used to read barcodes. The barcodes have to be moved into the immediate vicinity of the reading device for the scanning procedure. If the samples are arranged in carrier units for the subsequent processing and multiple such carrier units are arrayed in succession at different distances to the reading device, the necessity exists that the reading device has to be settable to read distances of different lengths. For this purpose, for example, zoom lenses can be used, which are each set by means of a suitable autofocus unit to the distance of the respective laboratory object to be read. A corresponding barcode reader is described in WO 2005/073895 A1 having the title "Autofocus barcode scanner and the like employing microfluidic lens", which has an electrically deformable lens filled with a liquid for the distance and/or focus setting. Such reading devices are very complex and therefore also costly and susceptible to error. The need therefore exists to provide simple, cost-effective, and particularly reliable reading devices which are suitable in particular for use in laboratory systems and facilities of the type mentioned.

SUMMARY OF THE INVENTION

It is an object of the present invention to provide a simple, precise, reliable, and broadly usable identification device for identifying identifiers on and/or features of laboratory objects and/or of samples located therein. This object is achieved according to the invention by the identification device defined in claim 1.

It is moreover an object of the present invention to equip a laboratory device with the proposed identification device in order to provide a device suitable for laboratory systems and/or facilities. This object is achieved according to the invention by the laboratory device according to claim 7.

It is a further object of the present invention to provide a corresponding identification method, which enables rapid, precise, reliable, and broadly usable identification of identifiers on and/or features of laboratory objects and/or of samples located therein. This object is achieved according to the invention by the method proposed in claim 13.

Specific embodiment variants according to the invention are specified in the dependent claims.

An identification device according to the invention for identifying identifiers on and/or features of laboratory objects and/or of samples located therein comprises:

- an optical recording unit having an optical sensor element, which is capable of recording an optical signal in the direction of an optical axis;
- a mirror having a reflection surface, which is at an angle in a range from 35° to 55°, in particular in a range of 42° to 48°, preferably of (essentially) 45° in relation to the optical axis;
- a transportation unit, on which the optical recording unit or the mirror is installed, and which is movable along a displacement path in the direction of the optical axis in such a way that a spacing between the optical recording unit and the mirror is variable, so that a recording distance is settable via the reflection surface between the optical recording unit and a laboratory object, in particular a sample container, such as a sample tube, a reagent tub, or a microplate, which is located abreast the optical axis at the height of the mirror, in such a way that the recording distance is within a depth of field of the optical recording unit; and
- an evaluation (/analysis) unit, which is operationally connected to the optical recording unit, and is configured to identify an identifier on the laboratory object and/or a feature of the laboratory object and/or a sample which is located in the laboratory object based on the optical signal reflected from the reflection surface.

In this case, the optical sensor element is capable of detecting light in at least one part of the electromagnetic spectrum which is visible (to humans) (i.e., in the wavelength range from 380 nm to 780 nm) and/or infrared light (i.e., in the wavelength range from 780 nm to 1 mm) and/or ultraviolet light (i.e., in the wavelength range from 10 nm to 380 nm) (i.e., in at least a part of the wavelength range from 10 nm to 1 mm).

The depth of field (synonymously also called field depth) is a measure of the extension of the focused range in the recording space of the optical recording unit. It describes the dimension of the distance range within which an identifier on and/or features of laboratory objects and/or of samples located therein are depicted sufficiently sharply to ensure reliable identification (for example, in 95%, preferably in 99% of the cases).

The transportation unit can, for example, be directly moved manually, for example, from one engagement point in the displacement path to the next. Alternatively, the transportation unit can be displaced, for example, via a mechanical deflection lever mechanism. The displacement path can be embodied, for example, as a rail, for example, in the form of a toothed rack.

In one embodiment variant, the identification device furthermore comprises:
- a drive unit for the motorized movement of the transportation unit, which is operationally connected to the drive unit; and
- a control unit, which is operationally connected to the drive unit, and is configured to set the (specifiable or predefined) recording distance within the depth of field of the optical recording unit by adjusting the spacing.

The control unit could establish in this case the position of the transportation unit via sensors, which are arranged, for example, in or on the displacement path.

In a further embodiment variant of the identification device, an item of information relating to a distance of the laboratory object from the mirror, in particular a perpendicular distance of the laboratory object from the optical axis, can be supplied to the control unit.

In a further embodiment variant of the identification device, the optical recording unit furthermore comprises a fixed-focus lens, which is designed in particular for the optimum focusing of laboratory objects, which are located at the recording distance from the optical recording unit measured via the reflection surface, and/or which in particular has a maximum resolution at the recording distance, wherein the (specifiable or predefined) recording distance is in particular in a range from 15 cm to 80 cm, preferably 50 cm.

In a further embodiment variant, an autofocus (zoom) lens could also be used, where as soon as the autofocus reaches its limits, and the resolution becomes excessively low, the transportation unit is moved, so that the recording distance again comes to rest within the depth of field of the autofocus (zoom) lens.

In a further embodiment variant, the identification device furthermore has a lighting unit, which is arranged at the optical recording unit (preferably) or at the mirror, and is capable of illuminating the laboratory objects, wherein in particular a luminosity of the lighting unit is settable by the control unit in dependence on the recording distance, and wherein the lighting unit in particular comprises one or more LEDs or laser diodes or a UV or IR light source.

In a further embodiment variant of the identification device, the optical recording unit is one of the following:
- a CCD scanner having a photodiode array as an optical sensor element;
- a laser scanner, which uses a laser beam for scanning at least a part of the laboratory object;
- a camera having an image sensor as an optical sensor element.

According to a further aspect of the present invention, a laboratory device, in particular a work surface or at least one working area for placing carrier units for accommodating laboratory objects, comprises an identification device according to the invention (according to one of the above-mentioned embodiment variants or a combination thereof), wherein the laboratory device has at least one working area edge and furthermore a plurality of insertion paths perpendicular to the working area edge, which are embodied for the insertion of carrier units for accommodating one or more laboratory objects, in particular sample containers, for example, sample tubes, reagent containers, or microplates, and wherein the identification device is arranged in such a way that the displacement path extends (essentially) perpendicularly to the working area edge.

In one embodiment variant of the laboratory device, at least one sensor, for example, a light barrier or a Hall sensor, is arranged along (for example, at a beginning) of at least one of the insertion paths, which sensor is capable of detecting the insertion of a carrier unit, and an item of information relating to a distance of the laboratory object from the mirror is derivable from an output signal of this at least one sensor, wherein the sensor is operationally connected to the control unit.

In a further embodiment variant of the laboratory device, at least one signal generator, for example, a magnet, is arranged on the carrier units, wherein in particular a signal generator is arranged in each case between individual receptacles for accommodating one of the multiple laboratory objects.

In a further embodiment variant of the laboratory device, the carrier units are embodied to accommodate multiple laboratory objects in an array. The array can be linear, or the receptacles for the individual laboratory objects can be arranged (slightly) laterally offset in relation to one another on the carrier units.

In a further embodiment variant, the laboratory device furthermore has a drawing-in device for the motorized drawing in of individual carrier units along the respective insertion path.

In a further embodiment variant, the laboratory device furthermore has a background light, in particular an LED background light, which is arranged in such a way that at least one insertion path is located between the background light and the mirror.

According to a further aspect of the present invention, an identification method according to the invention for identifying identifiers on and/or features of laboratory objects and/or features of samples which are located in the laboratory objects comprises the following steps:
- arranging an optical recording unit having an optical sensor element, which is capable of recording an optical signal in the direction of an optical axis;
- arranging a mirror having a mirror surface, which is at an angle in a range from 35° to 55°, in particular in a range from 42° to 48°, preferably of (essentially) 45° in relation to the optical axis;
- providing a first carrier unit for accommodating at least one first laboratory object, in particular a sample container, for example, a sample tube, a reagent tub, or a microplate, for insertion along a first insertion path;
- adjusting a spacing between the optical recording unit and the mirror along a displacement path in the direction of the optical axis, so that a (specified or predefined) first recording distance between the optical recording unit and the first laboratory object via the reflection surface is within the depth of field of the optical recording unit, wherein the displacement path extends essentially parallel and abreast to the first insertion path;
- (first) insertion of the first carrier unit along the first insertion path and, during this, recording of a first optical signal reflected from the reflection surface of a first identifier on the first laboratory object and/or a first feature of the first laboratory object and/or a sample which is located in the first laboratory object; and evaluating (/analyzing) the first optical signal to identify the first identifier and/or the first feature of the first laboratory object and/or the sample.

In one embodiment variant of the identification method, the distance is adjusted by motor by means of a control drive.

In a further embodiment variant of the identification method, the insertion or drawing in of the first carrier unit is performed by a motor.

In a further embodiment variant, the identification method comprises the following further step:

detecting an item of information relating to a distance of the laboratory object from the mirror, wherein this information is used for adjusting the spacing (for example, by a control unit), so that the recording distance is within the depth of field of the optical recording unit.

In a further embodiment variant, the identification method comprises the following further steps:

providing a second carrier unit for accommodating at least one second laboratory object for insertion along a second insertion path, wherein the second insertion path extends essentially parallel to the first insertion path and is at a different distance from the mirror than the first insertion path, in particular measured as a perpendicular distance from the optical axis;

adjusting the spacing between the optical recording unit and the mirror along the displacement path in the direction of the optical axis, so that a (specified or predefined) second recording distance between the optical recording unit and the second laboratory object via the reflection surface is within the depth of field of the optical recording unit;

inserting the second carrier unit along the second insertion path and, during this, recording a second optical signal reflected from the reflection surface of a second identifier on the second laboratory object and/or a second feature of the second laboratory object and/or a sample, which is located in the second laboratory object; and evaluating (/analyzing) the second optical signal to identify the second identifier and/or the second feature of the second laboratory object and/or the sample.

In one embodiment variant for identifying further identifiers on and/or features of laboratory objects and/or features of samples which are located in the laboratory objects, the identification method comprises the following further step:

second insertion of the first carrier unit along the first or a further insertion path, wherein the further insertion path extends (essentially) parallel to the first insertion path and is at a different distance from the mirror than the first insertion path, in particular measured as a perpendicular distance from the optical axis, and wherein in comparison to the first insertion, an opposing side of the first laboratory object is aligned essentially perpendicularly toward the optical axis.

In a further embodiment variant of the identification method, the identifier to be identified on the laboratory object is one of the following:

a barcode;
a 2D or matrix code, for example, a QR code or dot code;
a 3D code, wherein, for example, a color tone, a color saturation, or a color brightness represents a third dimension;
a hologram;
an engraving;
an embossing, wherein the identifier is in particular printed on a label attached to the laboratory object, or was applied directly to the laboratory object by means of ink or laser beam or by means of exposure of a light-sensitive coating.

In a further embodiment variant of the identification method, the feature of the laboratory object to be identified and/or the sample which is located in the laboratory object is one of the following physical features:

size of the laboratory object, in particular the sample container;
diameter of the laboratory object, in particular the sample tube;
fill level of the laboratory object, for example, based on a phase transition between liquid and air, in particular to determine whether the laboratory object is empty;
boundary layer(s) between various components of the sample, for example, the boundary between blood serum and blood clot;
whether a cover is placed on the laboratory object and also color and/or type of the cover.

In a further embodiment variant of the identification method, a background light, in particular an LED background light, or a background having a, for example, high-contrast, pattern or coloration is in particular suitable for obtaining an optical signal which results in a more reliable and/or rapid identification of the identifier on the laboratory object or the feature of the laboratory object and/or the sample which is located in the laboratory object.

It is to be noted the combinations of the above-mentioned embodiment variants can result in further, more special exemplary embodiments.

BRIEF DESCRIPTION OF THE DRAWINGS

Nonlimiting exemplary embodiments of the present invention are explained in greater detail hereafter on the basis of drawings. In the figures:

FIG. 4 *b*) shows a top view of an exemplary embodiment of a laboratory device according to the invention having an exemplary embodiment of an identification device according to the invention having an inserted carrier unit farther away from the identification device than in FIG. 4 *a*).

In the figures, identical reference signs stand for identical elements.

DETAILED DESCRIPTION OF THE INVENTION

Figure 1:
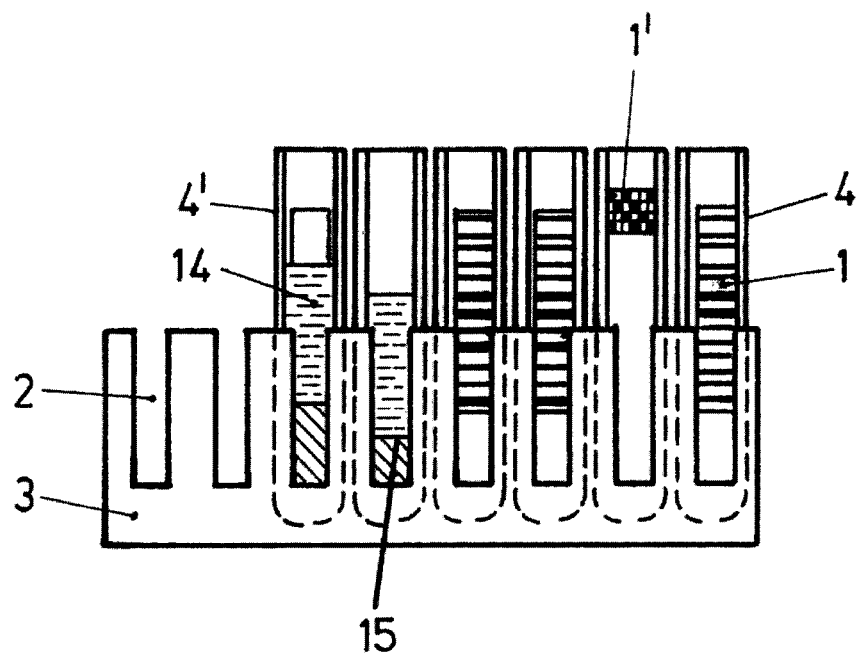
FIG. 1 shows a view of an exemplary embodiment of a carrier unit for accommodating multiple sample tubes.

FIG. 1 shows a frontal view of a carrier unit 3 (often called a "strip rack" in technical jargon), in which a plurality (for example, 8 or 16) of laboratory objects in the form of sample tubes 4, 4' are arranged linearly in an array in equidistant holders adjacent to one another. A label having a barcode 1, 1' is adhesively bonded as an identifier to the sample tubes 4, 4'. The sample tubes 4, 4' are each aligned in the holder in such a way that the barcode 1, 1' is well recognizable in a reading slot 2. A one-dimensional/1D barcode (or bar code) 4 is attached to the first, third, and fourth sample tubes 4 from the right. A two-dimensional/2D barcode 1' (or matrix code) is attached to the second sample tube 4 from the right. The sixth sample tube 4' from the right is arranged in the holder in such a way that the barcode is located on the side of the sample tube 4' which faces away. The sample 14 which is located in the sample tube 4' is thus not concealed by the label having the barcode 1, 1', so that, for example, the fill level of the sample tube 4' or a boundary layer 15 (see also the fifth sample tube 4' from the right) is recognizable between different components of the sample 14.

Figure 2:
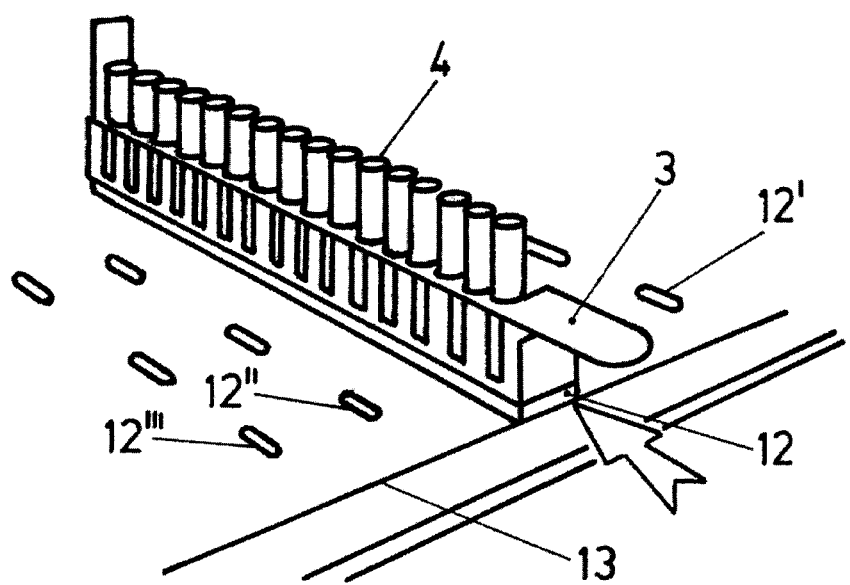
FIG. 2 shows a perspective view of an inserted carrier unit on a working area.

FIG. 2 shows the carrier unit 3 from FIG. 1 on a working area 13 in a perspective view. To read and/or identify the barcode 1 on each individual sample tube 4, the carrier unit 3 is now inserted, usually manually, along an insertion path 12 onto the working area 13. Further carrier units 3 are now each inserted in succession along a different insertion path 12', 12", 12''' onto the working area 13. The insertion or drawing in of the carrier units 3 onto the working area 13 can alternatively also be performed by a motor by means of a drawing-in device (not shown in FIG. 2) along the respective insertion path 12, 12', 12", 12'''.

Figure 3:
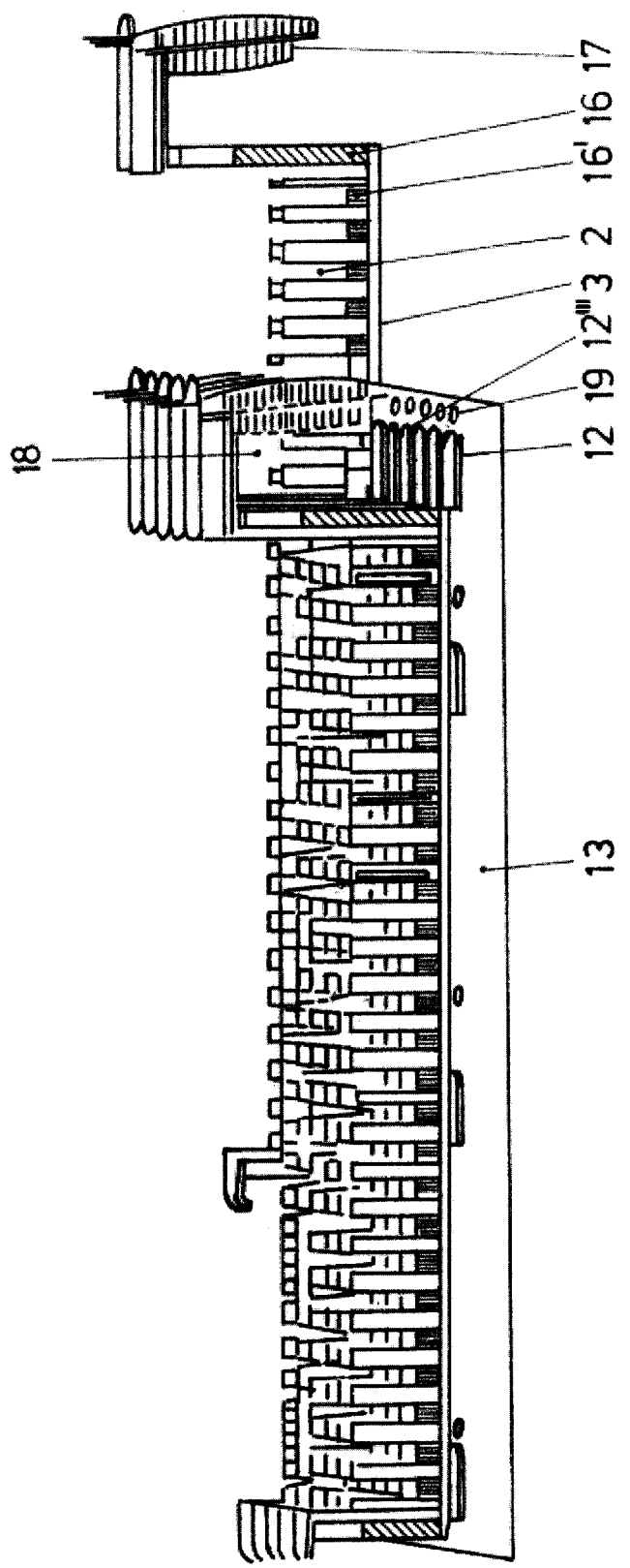
FIG. 3 shows a perspective view of multiple inserted carrier units and one partially inserted carrier unit on a working area.

FIG. 3 shows a working area 13, on which multiple carrier units 3 have already been inserted completely and one carrier unit 3 has only been inserted partially onto the working area 13. By means of the large barcode 16 on the carrier unit 3, it is identifiable (->carrier unit number or batch number). A small barcode 16', which indicates the holder or position number for the individual sample tubes 4, is located on the carrier unit 3 at each holder. A sensor, for example, a Hall sensor 19, detects along which insertion path 12, 12', 12", 12''' the carrier unit 3 is inserted. This information is used to set the spacing between the optical recording unit and the mirror in such a way that a recording distance via the reflection surface between the optical recording unit and the sample tube 4 is within the depth of field of the optical recording unit 5. As is apparent from FIG. 3, the individual barcodes 1, 1', 16, and 16' can be identified during the insertion through the receptacle gap 18, which is formed like a tunnel by the handles 17 of the already completely inserted carrier units 3.

The barcode reading and/or identification unit has to be embodied and arranged in relation to the insertion paths 12, 12', 12", 12''' in such a way that the barcode 1 of each individual sample tube 4 can be read or identified in an unobstructed and reliable manner during the insertion or introduction of the carrier units 3, which requires that the recording distance between the optical recording unit and the sample tube 4 to be identified has to be within the depth of field of the optical recording unit. The attempt is made in this case to arrange the identification device in the most space-saving possible manner on the working area 13, so that the laboratory device is embodied as compactly as possible.

Figure 4:
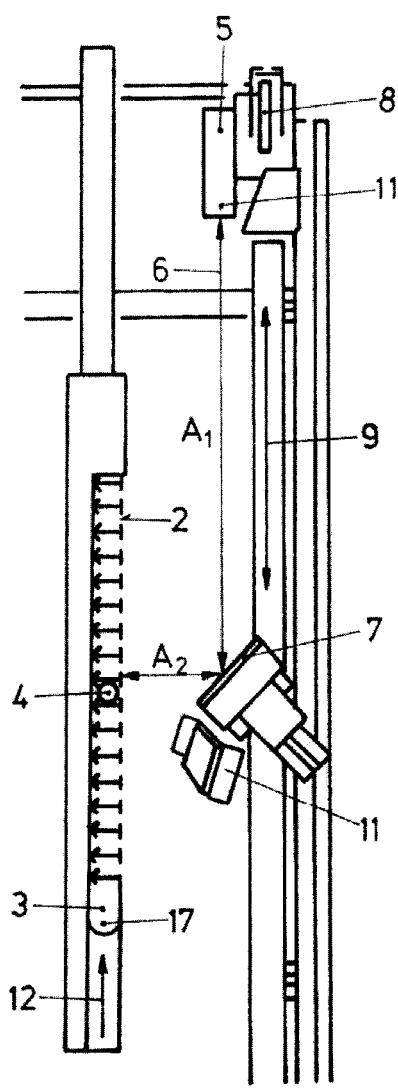
FIG. 4 *a*) shows a top view of an exemplary embodiment of a laboratory device according to the invention having an exemplary embodiment of an identification device according to the invention having a carrier unit inserted close to the identification device.
Figure 4:
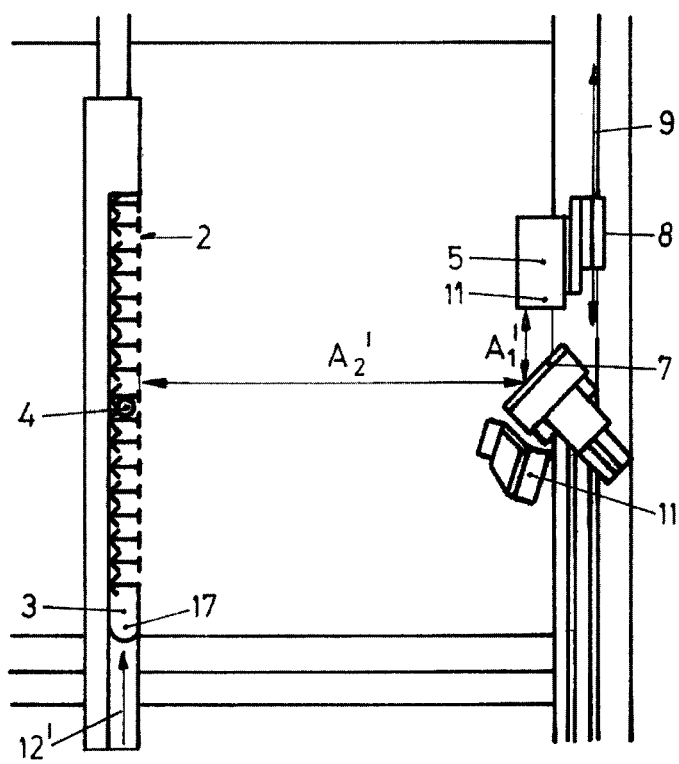

These specifications are achieved by way of example according to the invention by the arrangement or device according to FIGS. 4 *a*) and 4 *b*). FIGS. 4 *a*) and 4 *b*) show a top view of an identification device according to the invention having a camera 5 as an optical recording unit. The camera 5 is installed on a transportation unit 8, which is moved by means of a drive (for example, electric stepping motor, not shown in FIGS. 4 *a*) and 4 *b*)) along a displacement path 9 (for example, in the form of a rail, for example, a toothed rack), which extends parallel to the insertion paths 12, 12', 12", 12''' and perpendicularly to the working area edge. The camera 5 now sees the barcode 1 on each of the sample tubes 4 via a mirror 1, which is at an angle of 45° in relation to the optical axis 6 of the camera 5, which extends parallel to the displacement path 9. Before the insertion of the carrier unit 3 along the insertion path 12 close to the mirror 7 at the perpendicular distance $A_2$ from the optical axis 6, as shown in FIG. 4 *a*), the spacing $A_1$ of the camera 4 to the mirror 7 is set in such a way that the total of $A_1$ and $A_2$ results in a recording distance within the depth of field of the fixed-focus lens 10 of the camera 5, in which the camera 5 can therefore identify the barcode with maximum sharpness and/or resolution.

In order that the control unit (not shown in FIGS. 4 *a*) and 4 *b*)) knows the spacing $A_2$, for example, a magnet is attached to the front of the carrier unit 3, which triggers a corresponding magnetic switch (for example, a Hall sensor or Reed switch), which is arranged at the beginning of each insertion path 12, 12', 12", 12''', upon approach of the carrier unit 3.

During the insertion, the spacing $A_1$ is kept constant and each sample tube 4 is moved past the mirror 7. As soon as a sample tube 4 arrives at the height of the mirror 7 (i.e., is at the perpendicular spacing $A_2$ from the point of intersection of the optical axis 6 with the mirror 7), the camera 4 records at least one image of the barcode 1, which is then analyzed in the evaluation unit to identify the barcode 1 and/or detect the information coded therein. The movement of the sample tubes 4 past the mirror 7 can also be detected by corresponding sensors, such as magnetic switches, for example, by further magnets being arranged in the carrier unit 3 with spacing to the holders, for example. Alternatively, a light barrier could be used for the same purpose.

To make the view of the mirror 7 clear, the entire carrier unit 3 is to be inserted beyond the mirror 7 along the insertion path 12 if possible, or the end of the carrier unit 3, for example, the handle 17, is to be designed in such a way that the mirror 7 is visible through it if a further carrier unit 3 is inserted on another insertion path 12', 12", 12'''.

In FIG. 4 *b*), the case is shown in which the carrier unit 3 is inserted along the insertion path 12' at a greater distance from the mirror 7 (that in FIG. 4 *a*)) at the perpendicular spacing $A_2'>A_2$ from the optical axis 6. Accordingly, the control unit has to move the camera 5 on the transportation unit 8 along the displacement path 9 closer toward the mirror 7 ($A_1'<A_1$), so that the recording distance remains the same (i.e., approximately constant and/or within the depth of field of the fixed-focus lens 10), as in the situation according to FIG. 4 *a*). The focus setting thus does not have to be performed on the camera lens itself, whereby the fixed-focus lens 10 is suitable for this application.

In order to ensure that the barcodes 1 are well readable during the recording by the camera 5, a lighting unit 11 can optionally be arranged at the mirror 7 (or preferably at the camera 5 as an LED ring), which illuminates the sample tubes 4 using suitable light. This lighting unit 11 can be constructed, for example, from LEDs or laser diodes, and/or can comprise a UV or IR light source. The latter could be helpful above all in the detection of a feature of the sample tube 4 (for example, its diameter) and/or a sample 14, which is located therein (for example, a boundary layer 15 or the fill level). In addition, a background light (not shown in FIGS. 4 *a*) and 4 *b*)) could also be used, which illuminates the sample tube 4 from the rear toward the mirror 7, so that a good contrast can be achieved between the background and the sample tube 4 to be recorded. For this purpose, a background having a suitable color or pattern could alternatively or additionally be used. The pattern can be used, for example, to determine the internal diameter of the sample tube 4, by utilizing the fact that the pattern is distorted upon observation to the material of the sample tube 4 or its contents 14 (for example, a liquid) because of an index of refraction deviating from that of air.

In order to be able to detect a feature of the sample 14 contained in the sample tube 4, it can be necessary to insert the carrier unit 3 reversed (i.e., rotated by 180°) once again, so that the rear side of the sample tubes 4', on which no barcode 1 is located, which covers the sample 14, can be recorded using the camera 5. The sample 14 could also, alternatively or additionally to the lighting from the front by means of the lighting unit 11 (and from the rear by means of the background light), be illuminated from the top and/or bottom using a suitable light source for this purpose.

Due to the arrangement of the identification device according to the invention perpendicular to the working area edge and parallel to the insertion paths 12, 12', 12", 12''' and due to the deflection of the image of the laboratory objects 4 to be recorded by means of the mirror 7, a very compact construction results, which may be attached easily (even later) to an existing working area 13. Because the spacing between the camera 5 and the mirror 7 is settable by means of the transportation unit 8, the recording distance to the laboratory object 4 to be recorded can be kept constant or within the depth of field of the lens of the camera 5, independently of how far away the insertion path 12, 12', 12", 12''' is from the mirror 7. It is therefore sufficient to equip the camera 5 with a fixed-focus lens 11 instead of a complex and costly zoom lens. The arrangement of the displacement path 9 perpendicular to the working area edge and/or parallel to the insertion paths 12, 12', 12", 12''' again enables a compact construction and moreover prevents the insertion paths 12, 12', 12", 12''' and the displacement path 9 from intersecting, which could result in collisions of the camera 5 with the carrier units 3.

LIST OF REFERENCE SIGNS 1 identifier, barcode label, 1D barcode (bar code)
1' identifier, 2D barcode (matrix code)
2 (barcode) reading slot
3 carrier unit (strip rack)
4 laboratory object, sample tube (with label in front)
4' laboratory object, sample tube (with label in rear)
5 optical recording unit, camera
6 optical axis
7 mirror
8 transportation unit
9 displacement path
10 fixed-focus lens
11 lighting unit
12, 12', 12", 12''' insertion path (multiple)
13 working area
14 sample, blood
15 boundary layer, phase transition
16 identifier (barcode) with carrier unit number
16' identifier (barcode) with holder/position number
17 handle of the carrier unit
18 receptacle gap
19 (Hall) sensor
$A_1, A_1'$ spacing from camera to mirror
$A_2, A_2'$ perpendicular spacing from mirror/optical axis to insertion path

The invention claimed is:

1. An identification device for identifying identifiers (1, 1') on features of laboratory objects (4, 4') and/or of samples (14) located therein, comprising:
   an optical recording unit (5) having an optical sensor element, which adapted to record an optical signal in the direction of an optical axis (6);
   a mirror (7) having a reflection surface, which is at an angle in a range from 35° to 55° in relation to the optical axis (6);
   a transportation unit (8), on which the optical recording unit (5) or the mirror (7) is installed, and which is movable along a displacement path (9) in the direction of the optical axis (6) in such a way that a spacing (A1, A1') between the optical recording unit (5) and the mirror (5) is changeable, so that a recording distance (A1+A2, A1'+A2') via the reflection surface between the optical recording unit (5) and a laboratory object (4, 4') which is located abreast the optical axis (6) at the height of the mirror (7), is settable so that the recording distance is within a depth of field of the optical recording unit (5); and
   an evaluation unit, which is operationally connected to the optical recording unit (5), and is configured to identify an identifier (1, 1') on the laboratory object (4, 4') and/or a feature of the laboratory object (4, 4') and/or a sample (14) which is located in the laboratory object (4, 4') based on the optical signal reflected from the reflection surface.

2. The identification device according to claim 1, furthermore comprising:
   a drive unit for the motorized movement of the transportation unit (8); and
   a control unit, which is operationally connected to the drive unit and is configured to set the recording distance within the depth of field of the optical recording unit (5) by adjusting the spacing (A1, A1').

3. The identification device according to claim 1, characterized in that an item of information relating to a distance of the laboratory object (4, 4') from the mirror (7), is supplied to the control unit.

4. The identification device according to claim 3, wherein the item of information relating to a distance of the laboratory object (4, 4') from the mirror (7) is a perpendicular distance of the laboratory object (4, 4') from the optical axis (6).

5. The identification device according to claim 1, characterized in that the optical recording unit (5) further comprises a fixed-focus lens (10).

6. The identification device according to claim 5, wherein the fixed-focus lens (10) is designed for optimum focusing of laboratory objects (4, 4'), which are located at the recording distance from the optical recording unit (5) measured via the reflection surface.

7. The identification device according to claim 5, wherein the recording distance is selected from the group consisting of in a range from 15 cm to 80 cm, and 50 cm.

8. The identification device according to claim 1, characterized in that the identification device furthermore has a lighting unit (11), which is arranged at the optical recording unit (5) or the mirror (7), and is adapted to illuminate the laboratory objects (4, 4').

9. The identification device according to claim 8, wherein a luminosity of the lighting unit (11) is settable by the control unit in dependence on the recording distance.

10. The identification device according to claim 8, wherein the lighting unit (11) comprises a light source selected from the group consisting of LEDs, laser diodes, a UV light source and an IR light source.

11. The identification device according to claim 1, characterized in that the optical recording unit (5) is one of the following:
a CCD scanner having a photodiode array as an optical sensor element;
a laser scanner, which uses a laser beam for scanning at least a part of the laboratory object (4, 4');
a camera (5) having an image sensor as an optical sensor element.

12. A laboratory device having an identification device according to claim 1, wherein the laboratory device has at least one working area edge and furthermore a plurality of insertion paths (12, 12', 12", 12"') essentially perpendicular to the working area edge, which are embodied for the insertion of carrier units (3) for accommodating one or more laboratory objects (4, 4') and wherein the identification device is arranged in such a way that the displacement path (9) extends essentially perpendicularly to the working area edge.

13. The laboratory device according to claim 12, characterized in that at least one sensor (19) is arranged along at least one of the insertion paths (12, 12', 12", 12"'), which sensor (19) is adapted to detect the insertion of a carrier unit (3), and an item of information relating to a distance (A2, A2') of the laboratory object (4, 4') from the mirror (7) is derivable from an output signal of this at least one sensor (19).

14. The laboratory device according to claim 12, characterized in that at least one signal generator is arranged on the carrier units.

15. The laboratory device according to claim 14, wherein the at least one signal generator is a magnet.

16. The laboratory device according to claim 14, wherein one signal generator is arranged in each case between individual receptacles for accommodating one or more laboratory objects (4, 4').

17. The laboratory device according to claim 12, characterized in that the carrier units (3) are embodied for accommodating multiple laboratory objects (4, 4') in one or more rows offset in relation to one another.

18. The laboratory device according to claim 12, characterized in that the laboratory device furthermore has a drawing-in device for the motorized drawing-in of individual carrier units (3) along the respective insertion path (12, 12', 12", 12"').

19. The laboratory device according to claim 12, characterized in that the laboratory device furthermore has a background light which is arranged in such a way that at least one insertion path (12, 12', 12", 12"') is located between the background light and the mirror (7).

20. The laboratory device according to claim 19, wherein the background is an LED background light.

21. The laboratory device according to claim 12, wherein the laboratory device is a working area (13).

22. The laboratory device according to claim 12, wherein the one or more laboratory objects (4, 4') are selected from the group consisting of sample containers, sample tubes (4, 4'), reagent containers, and microplates.

23. The identification device according to claim 1, wherein the laboratory object (4, 4') is selected from the group consisting of a sample container, a sample tube (4, 4'), a reagent tub, and a microplate.

24. The identification device according to claim 1, wherein the mirror (7) has a reflection surface, which is at an angle selected from the group consisting of in a range from 42° to 48° in relation to the optical axis (6), and essentially of 45° in relation to the optical axis (6).

25. An identification method for identifying identifiers (1, 1') on features of laboratory objects (4, 4') and/or features of samples (14) which are located in the laboratory objects (4, 4'), comprising the following steps:
arranging an optical recording unit (5) having an optical sensor element, which is adapted to record an optical signal in the direction of an optical axis (6);
arranging a mirror (7) having a reflection surface, which is at an angle in a range from 35° to 55° in relation to the optical axis (6),
providing a first carrier unit (3) for accommodating at least one first laboratory object (4) for insertion along a first insertion path (12, 12', 12", 12"');
adjusting a spacing (A1, A1') between the optical recording unit (5) and the mirror (7) along a displacement path (9) in the direction of the optical axis (6), so that a first recording distance (A1+A2, A1'+A2') between the optical recording unit (5) and the first laboratory object (4, 4') via the reflection surface is within the depth of field of the optical recording unit (5), wherein the displacement path (9) extends essentially parallel and abreast to the first insertion path (12, 12', 12", 12"');
inserting the first carrier unit (3) along the first insertion path (12, 12', 12", 12"') and, during this, recording of a first optical signal reflected from the reflection surface of a first identifier (1, 1') on a first feature of the first laboratory object (4, 4') and/or a sample (14), which is located in the first laboratory object (4, 4'); and
evaluating the first optical signal to identify the first identifier (1, 1') and/or the first feature of the first laboratory object (4, 4') or the sample (14).

26. The identification method according to claim 25, comprising the following further step:
detecting an item of information relating to a distance (A2, A2') of the laboratory object (4, 4') from the mirror (7).

27. The identification method according to claim 25, wherein the adjustment and/or the insertion are performed by motor.

28. The identification method according to claim 25, characterized in that the identifier to be identified on the laboratory object (4, 4') is one of the following:
a barcode (1);
a 2D code (1');
a 3D code;
a hologram;
an engraving;
and embossing.

29. The identification method according to claim 28, wherein the identifier is affixed to the laboratory object (4, 4') by a method selected from the group consisting of being printed on a label attached to the laboratory object (4, 4'), being applied directly to the laboratory object (4, 4') by means of ink or laser beam, and being applied directly to the laboratory object (4, 4') by means of exposure of a light-sensitive coating.

30. The identification method according to claim 28, wherein the 2D code (1') is selected from the group consisting of a QR code and a dot code.

31. The identification method according to claim 28, wherein the third dimension of the 3D code is represented by a feature selected from the group consisting of color tone, color saturation, or color brightness.

32. The identification method according to claim 25, characterized in that the feature to be identified of the laboratory object (4, 4') and/or the sample (14) which is located in the laboratory object (4, 4') is one of the following physical features:
  size and type of the laboratory object (4, 4');
  diameter of the laboratory object (4, 4');
  fill level of the laboratory object (4, 4').
  a boundary layer (15) between two different components of the sample (14);
  whether a cover is placed on the laboratory object (4, 4') and the color and/or type of the cover.

33. The identification method according to claim 32, wherein the size and type of the laboratory object (4, 4') is the size and type of the sample container.

34. The identification method according to claim 32, wherein the diameter of the laboratory object (4, 4') is the diameter of the sample tube (4, 4').

35. The identification method according to claim 32, wherein the fill level of the laboratory object (4, 4') is based on a phase transition between liquid and air for determining whether the laboratory object (4, 4') is empty.

36. The identification method according to claim 32, wherein the boundary layer (15) between two different components of the sample (14) is the boundary (15) between blood serum and blood clot.

37. The identification method according to claim 25, characterized in that a background light is used, and is adapted to obtain an optical signal which results in a more reliable and/or rapid identification of the identifier (1, 1') on the laboratory object (4, 4') or of the feature of the laboratory object (4, 4') and/or the sample (14), which is located in the laboratory object (4, 4').

38. The identification method according to claim 37, wherein the background light is selected from the group consisting of an LED background light and a background having a pattern or color.

39. The identification device according to claim 25, wherein the laboratory object (4, 4') is selected from the group consisting of a sample container, a sample tube (4, 4'), a reagent tub, and a microplate.

40. The identification device according to claim 25, wherein the mirror (7) has a reflection surface, which is at an angle selected from the group consisting of in a range from 42° to 48° in relation to the optical axis (6), and essentially of 45° in relation to the optical axis (6).

* * * * *